Patented July 20, 1943

2,324,854

UNITED STATES PATENT OFFICE 2,324,854

PROCESS FOR SEPARATION OF ACRYLIC ACID NITRILE

Peter Kurtz, Johannes Casper, and Herbert Schwarz, Leverkusen - Wiesdorf, Germany; vested in the Alien Property Custodian No Drawing. Application February 12, 1941, Serial No. 378,567. In Germany January 1, 1940

3 Claims. (Cl. 260—464)

U. S. application of Peter Kurtz, Serial No. 343,269 describes a process of preparing acrylic acid nitrile which comprises bringing acetylene together with hydro-cyanic acid into contact with a suitable catalyst. This process is based on the perception that catalysts for bringing about those addition reactions of acetylene which result in vinyl derivatives thereof also effect the addition of hydro-cyanic acids on acetylene. The process consists in bringing acetylene together with hydrocyanic acid into contact with an acid reacting solution of cuprous chloride as a catalyst.

In this process acetaldehyde, monovinylacetylene, divinylacetylene, and higher boiling compounds are obtained as by-products which leave the reaction vessel together with the acrylic acid nitrile, the excess acetylene, the nonconverted hydrocyanic acid, and water vapours. The separation of the acrylic acid nitrile may be accomplished by condensing it together with the by-products—with the exception of acetylene which is recycled—and fractionally distilling. The separation of acrylic acid nitrile from monovinyl acetylene, acetaldehyde, and hydrocyanic acid causes no difficulties and with respect to those by-products a fractionation would be operable. Difficulties however arise from the divinyl acetylene due to the similar boiling points of this substance and acrylic acid nitrile; and practically speaking separation from divinyl acetylene is impossible by a distilling operation. A further difficulty consists in the sensitiveness of divinyl acetylene to heat and therefore a heating process must be avoided.

Now we have found that the acrylic acid nitrile may be separated in a simple manner from the reaction mixture obtained according to the process of application, Serial number 343,269. Our process consists in a washing operation of the reaction mixture with a suitable solvent especially water.

The gas mixture leaving the reaction vessel is continuously washed in a washing column preferably under atmospheric pressure and at low temperatures (0–20° C.). Only small quantities of acetylene and monovinyl acetylene but almost the total quantity of acetaldehyde, hydrocyanic acid and acrylic acid nitrile dissolve in the washing medium. By using for example for the washing of 125 parts by volume of gas mixture, 1 part by volume of water of a temperature of 15–20° C., 96% of the acrylic acid nitrile are absorbed, the water containing only 0.4% of dissolved acetylene and traces of monovinylacetylene. Divinyl acetylene is not dissolved in the washing water. The loss of acetylene which takes place in the washing process, is therefore very low. By increasing the ratio of gas mixture to washing water it is possible to wash out the acrylic acid nitrile in a still more complete way but then the quantity of the dissolved acetylene is also increased. Generally speaking all conditions must be chosen in such a way that a high yield of dissolved acrylic acid nitrile corresponds to a small loss of acetylene only. If necessary however it is possible to recover and recycle the acetylene dissolved in the washing water.

The aqueous solution obtained is distilled in order to recover the acrylic acid nitrile.

The acetylene which leaves the washing column contains mono- and divinyl acetylene. It may be freed from these products by low cooling and recycled.

*Example*

Through 2.5 liters of a catalyzer composed of 300 parts of cuprous chloride, 100 parts of ammonium chloride, 5 parts of concentrated hydrochloride acid, 10 parts of copper powder and 400 parts of water, 0.25 liter of acetylene together with 26 g. of hydrocyanic acid per hour are passed in at a temperature of 80° C. The escaping gas mixture is washed in a conventional washin column, filled with Raschig rings, with 2 liters of water per hour. The aqueous solution leaving the column is continuously distilled. An azeotropic mixture consisting of acrylic acid nitrile and water passes over which is somewhat contaminated with hydrocyanic acid and acetaldehyde. The raw acrylic acid nitrile which forms an oily layer is separated, dried, for example with calcium chloride, and then fractionated. After a small fraction at a low temperature which consists chiefly of acetaldehyde and hydrocyanic acid, the pure acrylic acid nitrile distills at 76–78° C. (760 mm.).

We claim:

1. Process for the separation of acrylic nitrile from the reaction mixture containing divinyl acetylene and obtained by reacting acetylene with hydrocyanic acid in the presence of a catalyst capable of bringing about addition reactions of acetylene with the formation of vinyl derivatives thereof, which comprises washing the gas mixture with water at a temperature ranging between 0 and 20° C. to dissolve the acrylic nitrile from the divinyl acetylene and recovering the acrylic nitrile from the aqueous solution thus obtained.

2. A process for the separation of acrylic nitrile from the reaction mixture containing the same in admixture with divinyl acetylene, acetylene and hydrocyanic acid obtained by reacting acetylene with hydrocyanic acid in the presence of a catalyst capable of bringing about addition reactions of acetylene with the formation of vinyl derivatives thereof, which comprises washing said reaction mixture with water at a temperature ranging between 0° and 20° C. and in an amount sufficient to dissolve the major portion of the acrylic acid nitrile, but insufficient to dissolve more than a trace of acetylene to thereby obtain an aqueous solution of acrylic acid nitrile free of divinyl acetylene, heating the thus obtained solution to distill therefrom an azeotropic mixture of water and acrylic acid nitrile and separating the acrylic acid nitrile in the thus obtained mixture from the water.

3. A process for the separation of acrylic nitrile from the reaction mixture containing the same in admixture with divinyl acetylene, acetylene and hydrocyanic acid obtained by reacting acetylene with hydrocyanic acid in the presence of a catalyst capable of bringing about addition reactions of acetylene with the formation of vinyl derivatives thereof, which comprises washing said reaction mixture with water at a temperature ranging between 0° and 20° C. and in an amount sufficient to dissolve the major portion of the acrylic acid nitrile, but insufficient to dissolve more than a trace of acetylene to thereby obtain an aqueous solution of acrylic acid nitrile free of divinyl acetylene, heating the thus obtained solution to distill therefrom an azeotropic mixture of water and acrylic acid nitrile, permitting said aqueous solution to stand whereby said acrylic acid nitrile separates from the water, separately removing the acrylic acid nitrile, drying the same to remove traces of water therefrom, and fractionally distilling the acrylic acid nitrile to recover the same in a purified state.

PETER KURTZ.
JOHANNES CASPER.
HERBERT SCHWARZ.